(12) United States Patent
Fan (10) Patent No.: US 9,647,541 B2
(45) Date of Patent: May 9, 2017

(54) HYSTERETIC CONTROL DC/DC CONVERTER SWITCHING FREQUENCY WITH REDUCED DEPENDENCE ON VOLTAGE AND CURRENT

(71) Applicant: Texas Instruments Incorporated, Dallas, TX (US)

(72) Inventor: Haifeng Fan, Tempe, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 153 days.

(21) Appl. No.: 14/476,745

(22) Filed: Sep. 4, 2014

(65) Prior Publication Data

US 2016/0072384 A1    Mar. 10, 2016

(51) Int. Cl.
*H02M 3/156* (2006.01)
*H02M 3/335* (2006.01)
*H02M 1/00* (2006.01)

(52) U.S. Cl.
CPC ....... *H02M 3/156* (2013.01); *H02M 3/33507* (2013.01); *H02M 2001/0003* (2013.01)

(58) Field of Classification Search
CPC .... H02M 3/156; H02M 3/33507; H02M 1/00; H02M 2001/0003; H02M 3/158
See application file for complete search history.

(56) References Cited

U.S. PATENT DOCUMENTS

| | | | | |
|---|---|---|---|---|
| 5,764,039 A | * | 6/1998 | Choi ................... | H02M 1/4225 323/222 |
| 7,319,308 B2 | * | 1/2008 | Marino ................ | H02M 3/155 323/222 |
| 7,538,535 B2 | * | 5/2009 | McDonald ........... | H02M 1/143 323/286 |
| 8,493,757 B2 | * | 7/2013 | Carletti .............. | H02M 1/4225 363/78 |
| 2011/0001460 A1 | * | 1/2011 | Buthker ............. | H02M 3/1588 323/283 |
| 2013/0307511 A1 | * | 11/2013 | De Vries ............... | H02M 3/156 323/284 |
| 2016/0003652 A1 | * | 1/2016 | A V ....................... | G01P 5/245 367/127 |

OTHER PUBLICATIONS

"LM5017 100 V, 600 mA Constant On-Time Synchronous Buck Regulator", Texas Instruments Incorporated, Dec. 2013, 26 pages (see pp. 1-19), U.S.

\* cited by examiner

*Primary Examiner* — Jessica Han
*Assistant Examiner* — Demetries A Gibson
(74) *Attorney, Agent, or Firm* — William B. Kempler; Charles A. Brill; Frank D. Cimino (57) ABSTRACT

In a hysteretic control DC/DC converter apparatus having a coupling circuit that couples a voltage input to a voltage output, a control signal is generated based on a node voltage at a node in the coupling circuit. The node is alternately connected to a fixed potential and disconnected from the fixed potential in accordance with a frequency of the control signal.

16 Claims, 6 Drawing Sheets

BOOST: $\quad t_{off} = \dfrac{1}{f_{sw} \cdot V_{OUT}} \cdot V_{IN}$

OFF TIMER: $\quad t_{off} = \dfrac{R \cdot C}{V_{OUT}} \cdot kV_{IN}$

THEN: $\quad f_{sw} = \dfrac{1}{k \cdot R \cdot C}$

BOOST: $\quad t_{on} = \dfrac{L \cdot I_{pk}}{V_{IN}}$ $t_{off1} = \dfrac{L \cdot I_{pk}}{V_{OUT} - V_{IN}}$ $T_{sw} = t_{on} + t_{off1} + t_{off2}$ OFF TIMER: $\quad C \cdot kV_{IN} = \dfrac{V_{OUT}}{R} \cdot t_{off1} + \dfrac{V_{IN}}{R} \cdot t_{off2}$ THEN: $\quad t_{off2} = R \cdot C - \dfrac{V_{OUT}}{V_{IN}} \cdot t_{off1}$ THEN: $\quad T_{sw} = k \cdot R \cdot C$ $f_{sw} = \dfrac{1}{k \cdot R \cdot C}$

SEPIC: $\quad t_{off} = \dfrac{1}{f_{sw} \cdot (V_{OUT} + V_{IN})} \cdot V_{IN}$ OFF TIMER: $\quad t_{off} = \dfrac{R \cdot C}{V_{OUT} + V_{IN}} \cdot kV_{IN}$ THEN: $\quad f_{sw} = \dfrac{1}{k \cdot R \cdot C}$

$$\text{SEPIC:} \quad t_{on} = \frac{L \cdot I_{pk}}{V_{IN}}$$

$$t_{off1} = \frac{L \cdot I_{pk}}{V_{OUT}}$$

$$T_{sw} = t_{on} + t_{off1} + t_{off2}$$

$$\text{OFF TIMER:} \quad C \cdot k V_{IN} = \frac{V_{OUT} + V_{IN}}{R} \cdot t_{off1} + \frac{V_{IN}}{R} \cdot t_{off2}$$

$$\text{THEN:} \quad t_{off2} = R \cdot C - \frac{V_{OUT} + V_{IN}}{V_{IN}} \cdot t_{off1}$$

$$\text{THEN:} \quad T_{sw} = k \cdot R \cdot C$$

$$f_{sw} = \frac{1}{k \cdot R \cdot C}$$

FLYBACK: $t_{off} = \dfrac{1}{f_{sw} \cdot (nV_{OUT} + V_{IN})} \cdot V_{IN}$

OFF TIMER: $t_{off} = \dfrac{R \cdot C}{nV_{OUT} + V_{IN}} \cdot kV_{IN}$

THEN: $f_{sw} = \dfrac{1}{k \cdot R \cdot C}$

FLYBACK: $t_{on} = \dfrac{L \cdot I_{pk}}{V_{IN}}$ $t_{off1} = \dfrac{L \cdot I_{pk}}{nV_{OUT}}$ $T_{SW} = t_{on} + t_{off1} + t_{off2}$ OFF TIMER: $C \cdot kV_{IN} = \dfrac{nV_{OUT} + V_{IN}}{R} \cdot t_{off1} + \dfrac{V_{IN}}{R} \cdot t_{off2}$ THEN: $t_{off2} = R \cdot C - \dfrac{nV_{OUT} + V_{IN}}{V_{IN}} \cdot t_{off1}$ THEN: $T_{SW} = k \cdot R \cdot C$ $f_{SW} = \dfrac{1}{k \cdot R \cdot C}$

FIG. 15

HYSTERETIC CONTROL DC/DC CONVERTER SWITCHING FREQUENCY WITH REDUCED DEPENDENCE ON VOLTAGE AND CURRENT

FIELD

The present work relates generally to hysteretic control DC/DC converters and, more particularly, to controlling switching frequency in such converters.

BACKGROUND

Hysteretic control DC/DC converters feature fast transient response. In conventional hysteretic control DC/DC converters, such as boost converters, single-ended primary-inductor converters (SEPICs) and flyback converters, the switching frequency changes with input voltage and output voltage. The switching frequency also changes with load current when the converter operates in discontinuous conduction mode (DCM), or when the converter is in cycle-by-cycle current limit. Conventionally, the off time of the control switch does not adapt to converter operating conditions. In addition, conventional off time solutions are typically limited to use with specifically corresponding individual topologies.

It is desirable in view of the foregoing to provide for various hysteretic control converter topologies having switching frequencies less dependent on voltage and current operating conditions of the converter.

DETAILED DESCRIPTION

Example embodiments of the present work use an adaptive off time control scheme, where the control switch is turned on when the off timer expires, and is turned off when the feedback voltage plus injected ripple exceeds the reference voltage. The off time is generated by utilizing the input voltage and switching node voltage. The switching node voltage charges a capacitor in a series RC circuit, and the voltage ramp across the capacitor then represents the information of volt-second product at the switching node. The voltage ramp is compared with a threshold voltage proportional to the input voltage. The threshold voltage is much lower than the switching node voltage when the control switch is open, and is also much lower than the input and output voltages (primary side reflected output voltage for flyback converter) as well. The off time is adaptive to the input and output voltages, and the output current. As a result, the switching frequency is only proportional to RC, and nearly constant over the ranges of the input and output voltages, and the output current.

As noted above, the off time is based on the input voltage and the switching node voltage. Since the switching node voltage represents not only the voltage amplitude at the switching node but also the corresponding time intervals (i.e., the volt-second product), the off time is adaptive to the input and output voltages, and the output current. The switching node voltage is adaptive to the topology, so the same identical off timer circuit can be used for any of boost, SEPIC, and flyback topologies, whether CCM or DCM.

Figure 1:
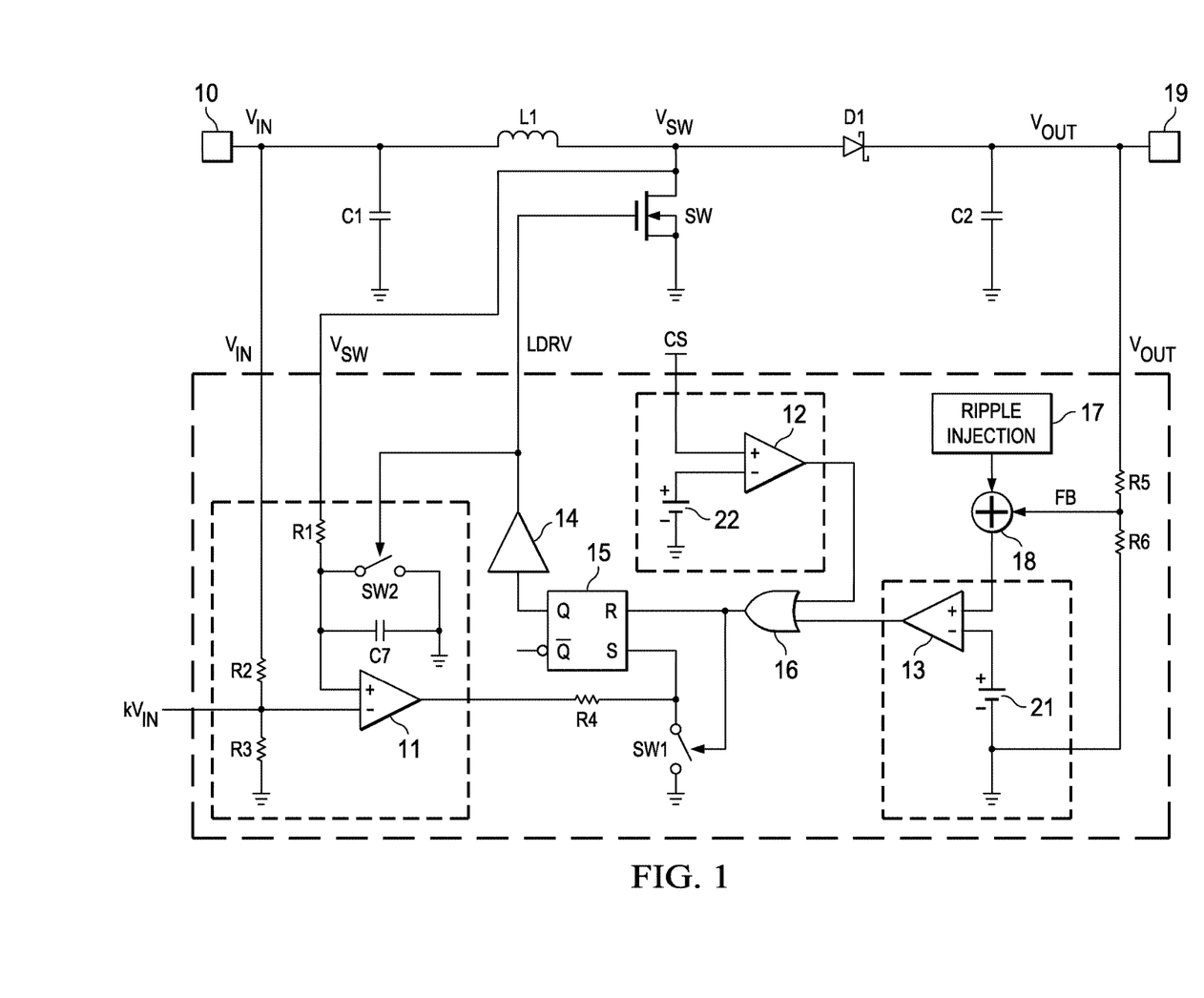
FIG. 1 diagrammatically illustrates a boost converter apparatus according to example embodiments of the present work.

FIG. 1 diagrammatically illustrates a boost converter apparatus according to example embodiments of the present work. A voltage input 10 and a voltage output 19 are coupled by a circuit arrangement including capacitors C1 and C2 respectively coupling voltage input 10 and voltage output 19 to ground, and inductance L1 and diode D1 connected together in series between C1 and C2. The inductance L1 is connected at one end to the anode of D1, and at its other end to C1 at voltage input 10. The cathode of D1 is connected to C2 at voltage output 19. An N-channel MOSFET switch, SW, is connected between ground and a node voltage Vsw at the anode of D1. The switch SW has a control input LDRV. The node (also referred to herein as the switching node) corresponding to Vsw (anode of D1 in FIG. 1) is connected to the fixed ground potential when SW is closed (on), and is disconnected from this potential when SW is open (off). Herein, SW is also referred to as the control switch, Vsw is also referred to as the switching node voltage, and Vsw is used interchangeably to refer both to the switching node voltage and its corresponding switching node.

A resistor divider R2 and R3 produces a reference voltage kVIN at the negative input of a comparator 11, where kVIN<<VIN, VOUT, and Vsw when the control switch is open. The positive input of comparator 11 is RC coupled to Vsw via resistor R1 and capacitor C7. The output of comparator 11 is coupled via resistor R4 to the Set input of an RS flip-flop 15 whose Q output drives LDRV via driver 14. LDRV also controls a switch SW2 that selectively shorts capacitor C7 to ground during the on time of the control switch to reset the voltage across C7 every switching cycle.

As is conventional in hysteretic control converters, a resistor divider R5 and R6 produces a feedback voltage proportional to the output voltage VOUT, designated FB in FIG. 1. Ripple is added to FB at 17 and 18, and the result is applied to the positive input of a comparator 13 whose negative input is set by a feedback reference voltage 21 (provided by a suitable reference supply). As is also conventional in hysteretic control converters, a current sense voltage CS is applied to the positive input of a comparator 12 whose negative input is set by a current limit reference voltage 22 (provided by a suitable reference supply). The outputs of the comparators 12 and 13 drive an OR gate 16 whose output drives the Reset input of the flip-flop 15 and controls a switch SW1 that selectively shorts the Set input of flip-flop 15 to ground. As is known in the art, the output of comparator 12 is high only in response to an overcurrent event, and the output of comparator 13 is seldom high, periodically pulsing briefly when the ripple (a voltage ramp signal) injected at 17 and 18 nears the peak of its ramp. The voltage FB is a DC voltage as known in the art.

When the flip-flop 15 is set by comparator 11 via R4 with SW1 off (open), LDRV turns on (closes) switches SW and SW2. When flip-flop 15 is reset by comparator 12 or comparator 13 via OR gate 16, switches SW and SW2 are turned off (opened) by LDRV, and switch SW1 is turned on (closed) by OR gate 16. With SW and SW2 off and SW1 on, Vsw produces a voltage ramp at the positive input of comparator 11 via the RC circuit formed by R1 and C7. The off time of switch SW is thus the time required for the voltage across C7 to ramp up to kVIN. This off time is thus proportional to the RC time constant defined by R1 and C7. The components R1, R2, R3, C7 and comparator 11 can therefore be seen to operate as a timer that determines the off time of SW. Because comparator 13 only briefly pulses the Reset input of flip-flop 15, the OR gate 16 will open SW1 in time for the output of comparator 11 to set flip-flop 15 to end the SW off time.

Figure 2:
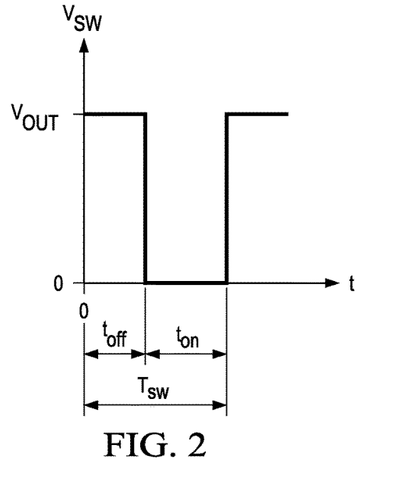
FIGS. 2 and 3 illustrate switching node voltage profile and corresponding equations for continuous conduction mode (CCM) operation of the apparatus of FIG. 1.
Figure 3:
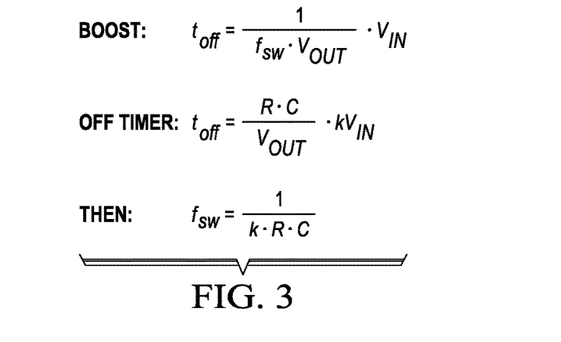

FIG. 2 is a switching node voltage profile showing on/off control of switch SW in the boost converter configuration of FIG. 1, operating in CCM. The profile shows the off time, toff, the on time, ton, and the switching period Tsw=1/fsw, where fsw is the frequency of the SW control signal LDRV. The profile also shows the corresponding switching node voltage amplitude during ton, zero, and switching node voltage amplitude during toff, VOUT. Pertinent equations for the operation shown in FIG. 2 are provided in FIG. 3, wherein R and C correspond to R1 and C7 of FIG. 1.

Figure 4:
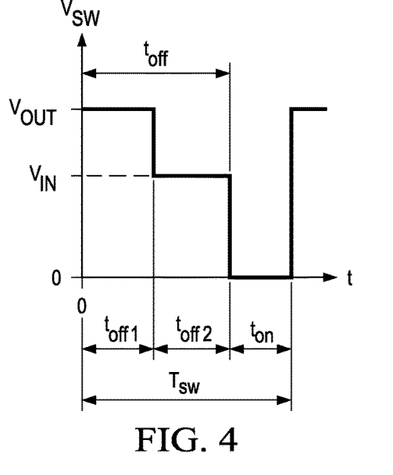
FIGS. 4 and 5 illustrate switching node voltage profile and corresponding equations for DCM operation of the apparatus of FIG. 1.
Figure 5:
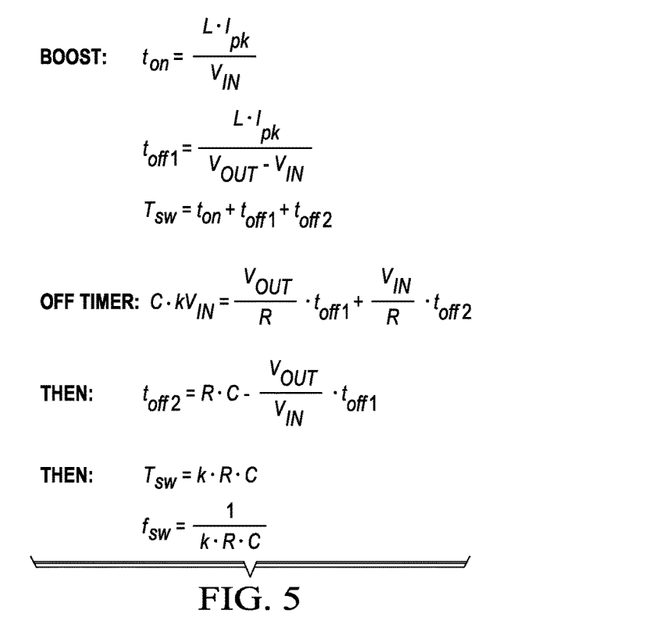

FIG. 4 is a switching node voltage profile showing on/off control of switch SW in the boost converter configuration of FIG. 1, operating in DCM. The profile shows the off time, toff=toff1+toff2, the on time, ton, and the switching period Tsw=1/fsw, where fsw is the frequency of the SW control signal LDRV. The profile also shows the corresponding switching node voltage amplitude during each time interval. During toff1, the control switch SW is off but the diode D1 is on, so the switching node voltage amplitude is VOUT. During toff2, both the control switch SW and diode D1 are off, so the switching node voltage amplitude is VIN. During ton, the control switch SW is on, so the switching node voltage amplitude is zero. Pertinent equations for the operation shown in FIG. 4 are provided in FIG. 5, wherein R and C correspond to R1 and C7 of FIG. 1, L corresponds to L1 of FIG. 1, and Ipk is the peak current of inductor L1 in FIG. 1.

Figure 6:
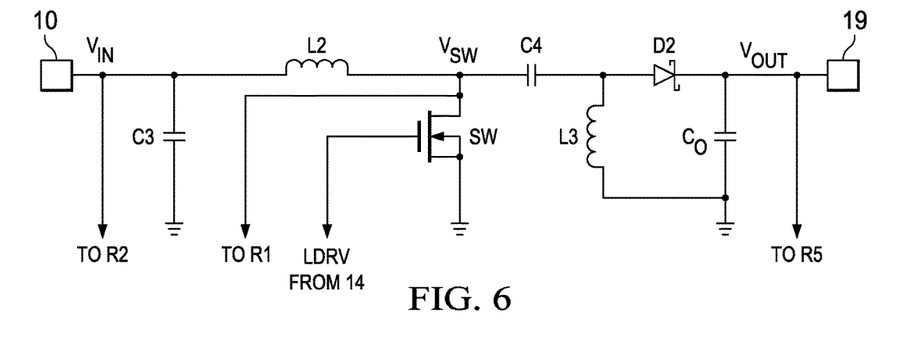
FIG. 6 diagrammatically illustrates a SEPIC apparatus according to example embodiments of the present work.

FIG. 6 diagrammatically illustrates a SEPIC apparatus according to example embodiments of the present work. Voltage input 10 and voltage output 19 are coupled by a circuit arrangement including capacitors C3 and C0 respectively coupling voltage input 10 and voltage output 19 to ground, and a series connection of an inductance L2, a capacitor C4 and a diode D2 between C3 and C0. The inductance L2 is connected at one end to C3 at voltage input 10. C4 is connected between the other end of L2 and the anode of D2. An inductance L3 is connected between the anode of D2 and ground, and the cathode of D2 is connected to C0 at voltage output 19. A switch SW having control input LDRV (see also FIG. 1) is connected between ground and the node voltage Vsw between L2 and C4. The switching node corresponding to Vsw is connected to the fixed ground potential when SW is closed (on), and is disconnected from this potential when SW is open (off). As shown in FIG. 6, the nodes 10, 19, Vsw and LDRV connect to the FIG. 1 circuitry identically in place of the correspondingly designated nodes in the FIG. 1 boost converter configuration.

Figure 7:
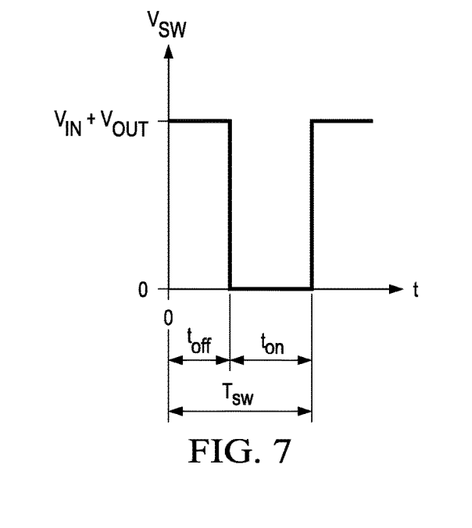
FIGS. 7 and 8 illustrate switching node voltage profile and corresponding equations for CCM operation of the apparatus of FIG. 6.
Figure 8:
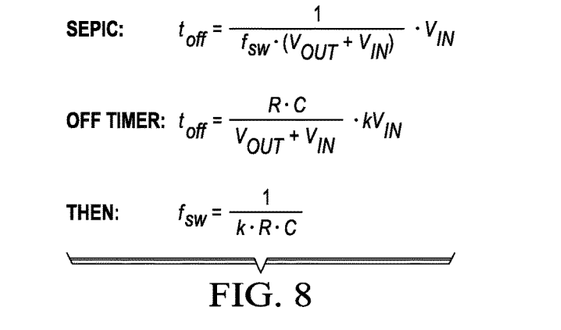

FIG. 7 is a switching node voltage profile showing on/off control of switch SW in the SEPIC configuration of FIG. 6, operating in CCM. The profile shows the off time, toff, the on time, ton, and the switching period Tsw=1/fsw, where fsw is the frequency of the SW control signal LDRV. The profile also shows the corresponding switching node voltage amplitude during ton, zero, and switching node voltage amplitude during toff, VIN+VOUT. Pertinent equations for the operation shown in FIG. 7 are provided in FIG. 8, wherein R and C correspond to R1 and C7 of FIG. 1.

Figure 9:
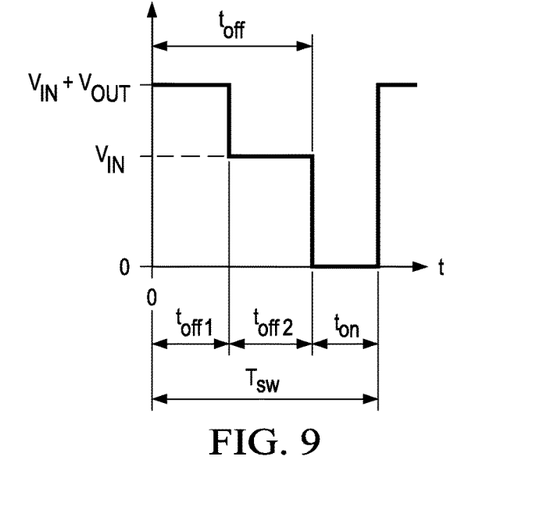
FIGS. 9 and 10 illustrate switching node voltage profile and corresponding equations for DCM operation of the apparatus of FIG. 6.
Figure 10:
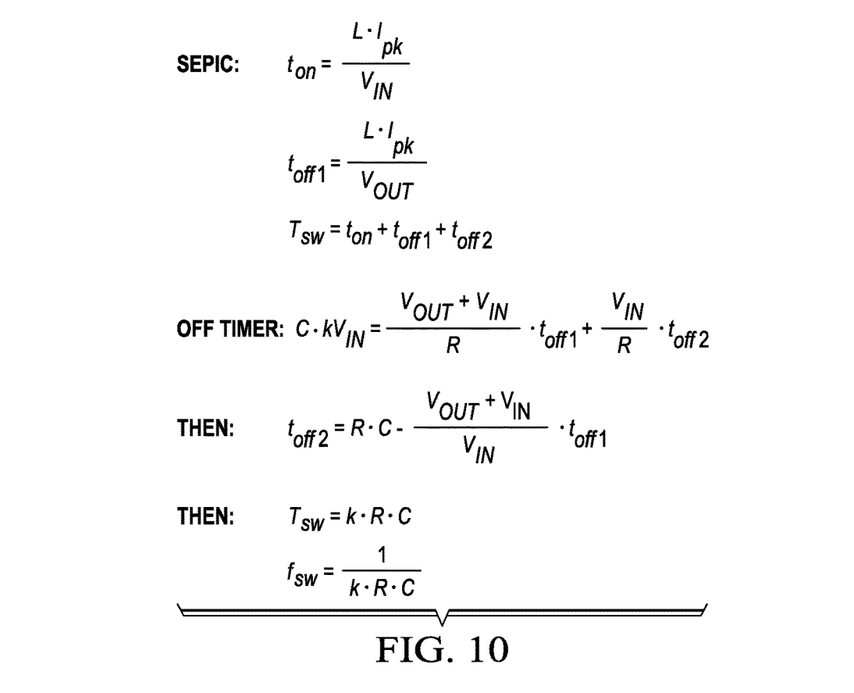

FIG. 9 is a switching node voltage profile showing on/off control of switch SW in the SEPIC configuration of FIG. 6, operating in DCM. The profile shows the off time, toff=toff1+toff2, the on time, ton, and the switching period Tsw=1/fsw, where fsw is the frequency of the SW control signal LDRV. The profile also shows the corresponding switching node voltage amplitude during each time interval. During toff1, the control switch SW is off but the diode D2 is on, so the switching node voltage amplitude is VIN+VOUT. During toff2, both the control switch SW and diode D2 are off, so the switching node voltage amplitude is VIN. During ton, the control switch SW is on, so the switching node voltage amplitude is zero. Pertinent equations for the operation shown in FIG. 9 are provided in FIG. 10, wherein R and C correspond to R1 and C7 of FIG. 1, L corresponds to L2 of FIG. 6, and Ipk is the peak current of the inductor L2 in FIG. 6.

Figure 11:
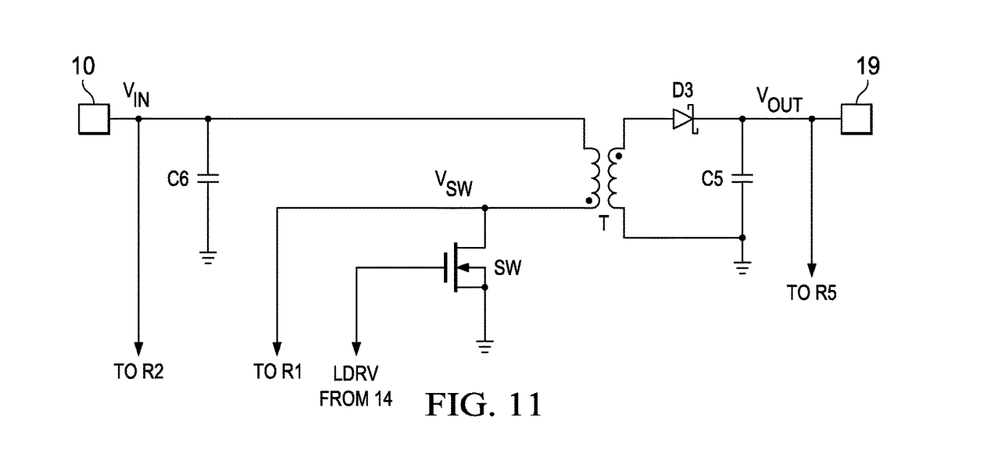
FIG. 11 diagrammatically illustrates a flyback converter apparatus according to example embodiments of the present work.

FIG. 11 diagrammatically illustrates a flyback converter apparatus according to example embodiments of the present work. Voltage input 10 and voltage output 19 are coupled by a circuit arrangement including capacitors C6 and C5 respectively coupling voltage input 10 and voltage output 19 to ground, and a transformer T having a first (left) winding connected at one end to C6 at voltage input 10. A switch SW (see also FIG. 1) having a control input LDRV is connected between ground and a second end (corresponding to switching node Vsw) of the first winding of T. The second (right) winding of T has a first end connected to the anode of a diode D3 whose cathode is connected to C5 at voltage output 19. A second end of the second winding of T is connected to ground. The switching node corresponding to Vsw is connected to the fixed ground potential when SW is closed (on), and is disconnected from this potential when SW is open (off). As shown in FIG. 11, the nodes 10, 19, Vsw and LDRV connect to the FIG. 1 circuitry identically in place of the correspondingly designated nodes in the FIG. 1 boost converter configuration.

Figure 12:
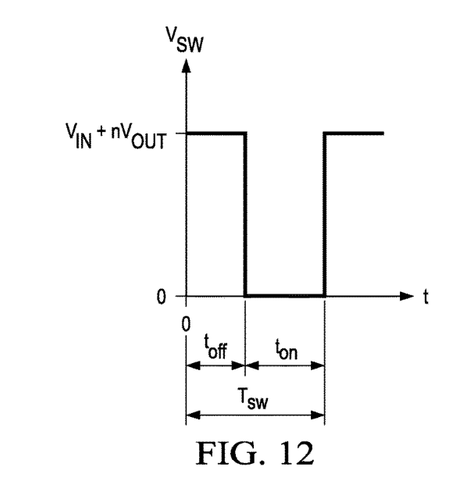
FIGS. 12 and 13 illustrate switching node voltage profile and corresponding equations for CCM operation of the apparatus of FIG. 11.
Figure 13:
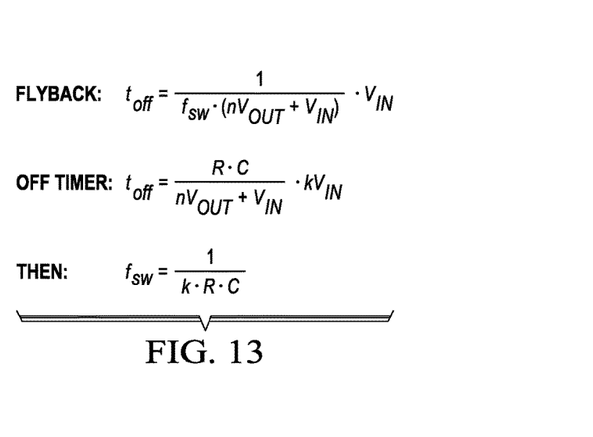

FIG. 12 is a switching node voltage profile showing on/off control of switch SW in the flyback configuration of FIG. 11, operating in CCM. The profile shows the off time, toff, the on time, ton, and the switching period Tsw=1/fsw, where fsw is the frequency of the SW control signal LDRV. The profile also shows the corresponding switching node voltage amplitude during ton, zero, and switching node voltage amplitude during toff, VIN+nVOUT. The constant n is the turn ratio of first winding to second winding of T in FIG. 11. Pertinent equations for the operation shown in FIG. 12 are provided in FIG. 13, wherein R and C correspond to R1 and C7 of FIG. 1.

Figure 14:
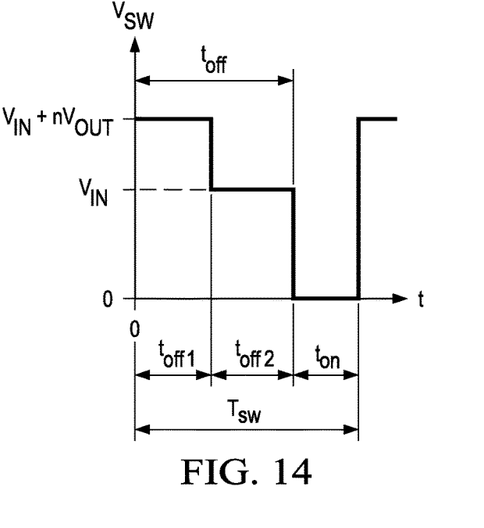
FIGS. 14 and 15 illustrate switching node voltage profile and corresponding equations for DCM operation of the apparatus of FIG. 11.
Figure 15:
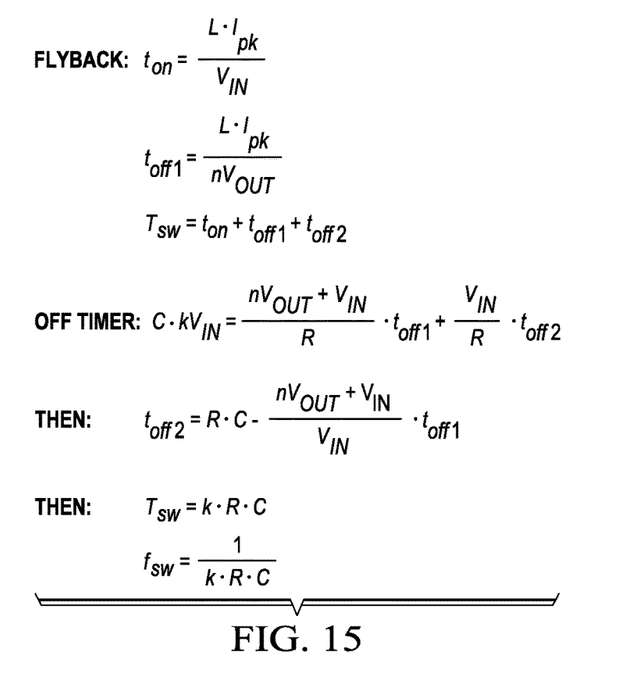

FIG. 14 is a switching node voltage profile showing on/off control of switch SW in the flyback configuration of FIG. 11, operating in DCM. The profile shows the off time, toff=toff1+toff2, the on time, ton, and the switching period Tsw=1/fsw, where fsw is the frequency of the SW control signal LDRV. The profile also shows the corresponding switching node voltage amplitude during each time interval. During toff1, the control switch SW is off but the diode D3 is on, so the switching node voltage amplitude is VIN+ nVOUT. During toff2, both the control switch SW and diode D3 are off, so the switching node voltage amplitude is VIN. During ton, the control switch SW is on, so the switching node voltage amplitude is zero. Pertinent equations for the operation shown in FIG. 14 are provided in FIG. 15, wherein R and C correspond to R1 and C7 of FIG. 1, L corresponds to the primary (left) side magnetizing inductance of transformer T in FIG. 11, and Ipk is the primary (left) side peak current of transformer T in FIG. 11.

As described above, the off time of control switch SW is determined based on the input voltage VIN and the switching node voltage Vsw. Since the switching node voltage Vsw represents not only the voltage amplitude at the switching node but also the corresponding time intervals (i.e., the volt-sec product), the off time is adaptive to the input and output voltages VIN and VOUT, as well as the output current. The switching node voltage Vsw is adaptive to the topology, so the same identical off timer circuit can be used for any of boost, SEPIC, and flyback topologies, whether operating in CCM or DCM.

Although example embodiments of the present work have been described above in detail, this does not limit the scope of the work, which can be practiced in a variety of embodiments.

What is claimed is:

1. A hysteretic control DC/DC converter apparatus, comprising:
    a voltage input;
    a voltage output;
    a coupling circuit that couples said voltage input to said voltage output;
    a switch coupled between a fixed potential and a node in said coupling circuit, said switch having a control input that receives a control signal having a frequency, wherein said switch is responsive to said control signal for alternately connecting said node to said fixed potential and disconnecting said node from said fixed potential in accordance with said frequency; and
    a further circuit coupled between said node and said control input, said further circuit configured to generate said control signal based on a node voltage at said node, wherein said further circuit is coupled to said voltage output and configured to produce a voltage signal by adding a ripple signal to a feedback voltage that is proportional to an output voltage at said voltage output which is compared with a reference voltage, and to cause said control signal to direct said off state when said voltage signal exceeds a further reference voltage, wherein the further circuit utilizes an adaptive off time control scheme, where the control switch is turned on when the off timer expires, it is turned off when the feedback voltage plus injected ripple exceeds the reference voltage.

2. The apparatus of claim 1, wherein said timer includes a capacitor resistively coupled to said node for charging in response to said node voltage.

3. The apparatus of claim 2, wherein said timer is configured to compare a voltage on said capacitor to a reference voltage that is proportional to and substantially less than an input voltage at said voltage input.

4. The apparatus of claim 2, wherein the duration of said off state is proportional to a time constant defined by said resistively coupled capacitor.

5. The apparatus of claim 1, wherein said further circuit includes a current sense node and is configured to cause said control signal to direct said off state when an output current of the apparatus exceeds a current limit.

6. The apparatus of claim 5, wherein said frequency remains approximately constant over variations in said input voltage, said output voltage and said output current.

7. The apparatus of claim 1, provided as one of a boost converter apparatus, a single-ended primary inductor converter (SEPIC) apparatus, and a flyback converter apparatus.

8. The apparatus of claim 7, provided for operation in one of a continuous conduction mode and a discontinuous conduction mode.

9. A method of operating a hysteretic control DC/DC converter having a coupling circuit that couples a voltage input to a voltage output, comprising:
    generating a control signal based on a node voltage at a node in the coupling circuit;
    alternately connecting the node to a fixed potential and disconnecting the node from the fixed potential in accordance with a frequency of the control signal,
    wherein said alternately connecting and disconnecting includes using the control signal to direct a switch alternately to assume an on state and an off state that respectively effect said connecting and disconnecting, and determining a duration of said off state, wherein said determining includes applying said node voltage to charge a capacitor resistively coupled to said node and comparing a voltage on the capacitor to a reference voltage that is proportional to and substantially less than an input voltage at the voltage input; and
    producing a voltage signal by adding a ripple signal to a voltage that is proportional to an output voltage at the voltage output, wherein said using includes using the control signal to direct the switch to assume said off state when the voltage signal exceeds a further reference voltage, wherein the further circuit utilizes an adaptive off time control scheme, where the control switch is turned on when the off timer expires, it is turned off when the feedback voltage plus injected ripple exceeds the reference voltage.

10. The method of claim 9, wherein said determining includes comparing a voltage on the capacitor to a reference voltage that is proportional to and substantially less than an input voltage at the voltage input.

11. The method of claim 10, including producing a voltage signal by adding a ripple signal to a voltage that is proportional to an output voltage at the voltage output, wherein said using includes using the control signal to direct the switch to assume said off state when the voltage signal exceeds a further reference voltage.

12. The method of claim 9, wherein said using includes using the control signal to direct the switch to assume said off state when an output current of the converter exceeds a current limit.

13. The method of claim 12, wherein said frequency remains approximately constant over variations in said input voltage, said output voltage and said output current.

14. The method of claim 9, wherein the duration of said off state is proportional to a time constant defined by the resistively coupled capacitor.

15. The method of claim 9, wherein the hysteretic control converter is provided as one of a boost converter, a SEPIC, and a flyback converter.

16. The method of claim 15, wherein the hysteretic control converter is for operation in one of a continuous conduction mode and a discontinuous conduction mode.

\* \* \* \* \*